(12) United States Patent
Duca (10) Patent No.: US 10,021,063 B2
(45) Date of Patent: Jul. 10, 2018

(54) APPARATUS AND METHOD FOR PROTECTING PROPRIETARY INFORMATION OVER PUBLIC NOTIFICATION INFRASTRUCTURE

(71) Applicant: Honeywell International Inc., Morris Plains, NJ (US)

(72) Inventor: Andrew Duca, Phoenix, AZ (US)

(73) Assignee: Honeywell International Inc., Morris Plains, NJ (US)

(*) Notice: Subject to any disclaimer, the term of this patent is extended or adjusted under 35 U.S.C. 154(b) by 63 days.

(21) Appl. No.: 14/863,006

(22) Filed: Sep. 23, 2015

(65) Prior Publication Data

US 2016/0337404 A1    Nov. 17, 2016

Related U.S. Application Data

(60) Provisional application No. 62/161,536, filed on May 14, 2015, provisional application No. 62/161,542, (Continued)

(51) Int. Cl.
*H04L 29/06* (2006.01)
*H04L 12/58* (2006.01)

(52) U.S. Cl.
CPC .............. *H04L 51/38* (2013.01); *H04L 51/14* (2013.01)

(58) Field of Classification Search
CPC ..... H04L 63/20; H04L 63/0421; H04L 67/26; H04L 51/38; H04L 51/14
See application file for complete search history.

(56) References Cited

U.S. PATENT DOCUMENTS

| | | |
|---|---|---|
| 6,941,557 B1 | 9/2005 | Jakobson et al. |
| 7,539,724 B1 | 5/2009 | Callaghan |
| | (Continued) | |

FOREIGN PATENT DOCUMENTS

| | | |
|---|---|---|
| JP | 2013-038601 A | 2/2013 |
| KR | 10-2003-0021537 A | 3/2003 |
| KR | 10-1077591 B1 | 10/2011 |
| KR | 10-2012-0087235 A | 8/2012 |
| KR | 10-2013-0006760 A | 1/2013 |
| KR | 10-2014-0059788 A | 5/2014 |
| KR | 10-2014-0103859 A | 8/2014 |

OTHER PUBLICATIONS

Hjelmvik, Erik, and Wolfgang John. "Breaking and improving protocol obfuscation." Chalmers University of Technology, Tech. Rep 123751 (2010).*

(Continued)

*Primary Examiner* — Chau Le
(74) *Attorney, Agent, or Firm* — Anthony Miologos (57) ABSTRACT

A method includes generating an obfuscation of a notification and transmitting the obfuscation to an end-user device via an unsecure notification infrastructure. The method also includes, in response to a request from the end-user device, transmitting the notification to the end-user device via a secure connection. The request from the end-user device can also be received via the secure connection. The method could also include receiving information associated with an event and storing at least one of the notification and the information in association with the obfuscation, where the notification contains the information. The event could denote an event associated with an industrial process control and automation system. The obfuscation could include a unique identifier associated with the notification or a summary of the notification.

19 Claims, 8 Drawing Sheets

Related U.S. Application Data filed on May 14, 2015, provisional application No. 62/161,548, filed on May 14, 2015, provisional application No. 62/161,622, filed on May 14, 2015, provisional application No. 62/161,644, filed on May 14, 2015, provisional application No. 62/161,657, filed on May 14, 2015, provisional application No. 62/161,558, filed on May 14, 2015.

(56) References Cited

U.S. PATENT DOCUMENTS

| | | | |
|---|---|---|---|
| 7,975,308 B1* | 7/2011 | Satish | G06F 17/30867 713/152 |
| 8,069,155 B2* | 11/2011 | Saxena | G06F 17/30306 707/698 |
| 8,184,952 B2* | 5/2012 | Sandoval | H04N 5/76 375/240.26 |
| 8,594,745 B1* | 11/2013 | Zheng | H04M 1/6091 370/409 |
| 9,008,629 B1* | 4/2015 | Masterman | H04W 52/0251 379/207.03 |
| 9,076,138 B2* | 7/2015 | Resch | G06F 11/1076 |
| 9,225,694 B1* | 12/2015 | Reitzen | H04L 63/0464 |
| 9,226,109 B2* | 12/2015 | Makris | H04W 4/025 |
| 9,424,742 B1* | 8/2016 | Solomon | G01D 4/00 |
| 9,459,901 B2* | 10/2016 | Jung | G06F 9/45558 |
| 2006/0116142 A1* | 6/2006 | Cofta | H04W 8/18 455/466 |
| 2007/0297557 A1 | 12/2007 | Kuwatani | |
| 2008/0183828 A1* | 7/2008 | Sehgal | H04W 4/02 709/206 |
| 2009/0106374 A1* | 4/2009 | Easwar | G06Q 10/107 709/206 |
| 2010/0082133 A1 | 4/2010 | Chouinard et al. | |
| 2011/0258065 A1* | 10/2011 | Fordyce, III | G06Q 10/10 705/26.1 |
| 2011/0276165 A1 | 11/2011 | Ko et al. | |
| 2012/0029678 A1 | 2/2012 | McGreevy et al. | |
| 2012/0079282 A1 | 3/2012 | Lowenstein et al. | |
| 2013/0061046 A1* | 3/2013 | Joy | H04L 67/146 713/162 |
| 2013/0084896 A1* | 4/2013 | Barkie | H04W 12/02 455/466 |
| 2013/0145474 A1* | 6/2013 | Mergi | H04L 63/04 726/26 |
| 2013/0179503 A1* | 7/2013 | Wilson | H04L 51/16 709/204 |
| 2013/0194604 A1* | 8/2013 | Asano | G06F 3/1229 358/1.13 |
| 2013/0211546 A1* | 8/2013 | Lawson | G05B 19/4185 700/9 |
| 2013/0212186 A1 | 8/2013 | Camp et al. | |
| 2014/0047107 A1 | 2/2014 | Maturana et al. | |
| 2014/0121789 A1 | 5/2014 | Brandes et al. | |
| 2014/0344369 A1 | 11/2014 | Goldberg et al. | |
| 2014/0358574 A1 | 12/2014 | Tara et al. | |
| 2015/0007265 A1 | 1/2015 | Aissi et al. | |
| 2015/0019654 A1* | 1/2015 | Wheeler | H04L 51/24 709/206 |
| 2015/0077263 A1 | 3/2015 | Ali et al. | |
| 2016/0191408 A1* | 6/2016 | Yajima | H04L 12/4641 709/225 |

OTHER PUBLICATIONS

Chen, Yuqun, et al. "Oblivious hashing: A stealthy software integrity verification primitive." International Workshop on Information Hiding. Springer Berlin Heidelberg, 2002.*

Torrubia, Andres, J. Mora Francisco, and Luis Marti. "Cryptography Regulations for E-commerce and Digital Rights Management." Computers & Security 20.8 (2001): 724-738.*

Mohajeri Moghaddam, Hooman, et al. "Skypemorph: Protocol obfuscation for tor bridges." Proceedings of the 2012 ACM conference on Computer and communications security. ACM, 2012.*

Cheng, Tsung-Huan, et al. "Evasion techniques: Sneaking through your intrusion detection/prevention systems." IEEE Communications Surveys & Tutorials 14.4 (2012): 1011-1020.*

Todd, Adam D., et al. "Alert verification evasion through server response forging." International Workshop on Recent Advances in Intrusion Detection. Springer Berlin Heidelberg, 2007.*

Product Overview, WIN-911 Software, Jan. 13, 2015, 2 pgs.

Product Overview, WIN-911 Enterprise Edition, Feb. 27, 2014, 2 pgs.

Product Data Sheet, WIN-911 Software, Mobile Edition, Smartphone Data Sheet, Sep. 25, 2015, 2 pgs.

Specter Instruments, WIN-911/Lite, Jan. 2005, 2 pgs.

Product Overview, WIN-911 Version 7, Feb. 11, 2014, 2 pgs.

Specter Instruments, Technical Brief, WEB-911 XTools, Jan. 26, 2009, 1 pg.

Technical Brief, "WIN-911 Version 7.17.00, Changes and Enhancements: General WIN-911: V6.18 to V7.17.00", Sep. 10, 2015, 15 pgs.

User's Manual, "WIN-911 V7.12", Oct. 11, 2011, 582 pgs.

Matthew G. Burd et al., "Apparatus and Method for Providing Event Context With Notifications Related to Industrial Process Control and Automation System", U.S. Appl. No. 14/868,058, filed Sep. 28, 2015.

Matthew G. Burd et al., "Apparatus and Method for Universal Annotation in Industrial Process Control and Automation System", U.S. Appl. No. 14/866,857, filed Sep. 29, 2015.

Andrew Duca et al., "Apparatus and Method for Automated Event Notification Read Receipt to Support Non-Repudiated Auditing or Other Functions in Industrial Process Control and Automation System", U.S. Appl. No. 14/868,168, filed Sep. 28, 2015.

Andrew Duca et al., "Apparatus and Method for Event Detection to Support Mobile Notifications Related to Industrial Process Control and Automation System", U.S. Appl. No. 14/868,905, filed Sep. 29, 2015.

Andrew Duca et al., "Apparatus and Method for Translating Industrial Process Control and Automation System Events Into Mobile Notifications", U.S. Appl. No. 14/869,629, filed Sep. 29, 2015.

Graeme Laycock et al., "Apparatus and Method for Using Configurable Rules Linking Triggers With Actions to Support Notifications Associated With Industrial Process Control and Automation System", U.S. Appl. No. 14/869,890, filed Sep. 29, 2015.

Notification of Transmittal of the International Search Report and the Written Opinion of the International Searching Authority, or the Declaration dated Aug. 9, 2016 in connection with International Patent Application No. PCT/US2016/029758.

Notification of Transmittal of the International Search Report and the Written Opinion of the International Searching Authority, or the Declaration dated Jul. 28, 2016 in connection with International Patent Application No. PCT/US2016/029953.

Notification of Transmittal of the International Search Report and the Written Opinion of the International Searching Authority, or the Declaration dated Jul. 28, 2016 in connection with International Patent Application No. PCT/US2016/030012.

Notification of Transmittal of the International Search Report and the Written Opinion of the International Searching Authority, or the Declaration dated Jul. 28, 2016 in connection with International Patent Application No. PCT/US2016/030037.

Notification of Transmittal of the International Search Report and the Written Opinion of the International Searching Authority, or the Declaration dated Aug. 9, 2016 in connection with International Patent Application No. PCT/US2016/030377.

Notification of Transmittal of the International Search Report and the Written Opinion of the International Searching Authority, or the Declaration dated Jul. 28, 2016 in connection with International Patent Application No. PCT/US2016/029984.

* cited by examiner

APPARATUS AND METHOD FOR PROTECTING PROPRIETARY INFORMATION OVER PUBLIC NOTIFICATION INFRASTRUCTURE

CROSS-REFERENCE TO RELATED APPLICATIONS AND PRIORITY CLAIM

This application claims priority under 35 U.S.C. § 119(e) to the following U.S. provisional patent applications:

U.S. Provisional Patent Application No. 62/161,536 filed on May 14, 2015 and entitled "APPARATUS AND METHOD FOR TRANSLATING INDUSTRIAL PROCESS CONTROL AND AUTOMATION SYSTEM EVENTS INTO MOBILE NOTIFICATIONS";

U.S. Provisional Patent Application No. 62/161,542 filed on May 14, 2015 and entitled "APPARATUS AND METHOD FOR USING CONFIGURABLE RULES LINKING TRIGGERS WITH ACTIONS TO SUPPORT NOTIFICATIONS ASSOCIATED WITH INDUSTRIAL PROCESS CONTROL AND AUTOMATION SYSTEM";

U.S. Provisional Patent Application No. 62/161,548 filed on May 14, 2015 and entitled "APPARATUS AND METHOD FOR AUTOMATED EVENT NOTIFICATION READ RECEIPT TO SUPPORT NON-REPUDIATED AUDITING IN INDUSTRIAL PROCESS CONTROL AND AUTOMATION SYSTEM";

U.S. Provisional Patent Application No. 62/161,558 filed on May 14, 2015 and entitled "APPARATUS AND METHOD FOR EVENT DETECTION TO SUPPORT MOBILE NOTIFICATIONS RELATED TO INDUSTRIAL PROCESS CONTROL AND AUTOMATION SYSTEM";

U.S. Provisional Patent Application No. 62/161,622 filed on May 14, 2015 and entitled "APPARATUS AND METHOD FOR PROTECTING PROPRIETARY INFORMATION OVER PUBLIC NOTIFICATION INFRASTRUCTURE";

U.S. Provisional Patent Application No. 62/161,644 filed on May 14, 2015 and entitled "APPARATUS AND METHOD FOR PROVIDING EVENT CONTEXT WITH NOTIFICATIONS RELATED TO INDUSTRIAL PROCESS CONTROL AND AUTOMATION SYSTEM"; and U.S. Provisional Patent Application No. 62/161,657 filed on May 14, 2015 and entitled "APPARATUS AND METHOD FOR UNIVERSAL ANNOTATION IN INDUSTRIAL PROCESS CONTROL AND AUTOMATION SYSTEM".

All of these provisional patent applications are hereby incorporated by reference in their entirety.

TECHNICAL FIELD

This disclosure relates generally to notification systems. More specifically, this disclosure relates to an apparatus and method for protecting proprietary information (such as information related to an industrial process control and automation system) over a public notification infrastructure.

BACKGROUND

Industrial process control and automation systems are often used to automate large and complex industrial processes. These types of systems routinely include sensors, actuators, and controllers. The controllers are often arranged hierarchically in a control and automation system. For example, lower-level controllers are often used to receive measurements from the sensors and perform process control operations to generate control signals for the actuators. Higher-level controllers are often used to perform higher-level functions, such as planning, scheduling, and optimization operations. Human operators routinely interact with controllers and other devices in a control and automation system, such as to review warnings, alarms, or other notifications and make adjustments to control or other operations.

SUMMARY

This disclosure provides an apparatus and method for protecting proprietary information over a public notification infrastructure.

In a first embodiment, a method includes generating an obfuscation of a notification and transmitting the obfuscation to an end-user device via an unsecure notification infrastructure. The method also includes, in response to a request from the end-user device, transmitting the notification to the end-user device via a secure connection.

In a second embodiment, an apparatus includes at least one memory configured to store a notification and an obfuscation of the notification. The apparatus also includes at least one interface configured to transmit the obfuscation to an end-user device via an unsecure notification infrastructure. The apparatus further includes at least one processing device configured, in response to a request from the end-user device, to initiate transmission of the notification to the end-user device via a secure connection.

In a third embodiment, a non-transitory computer readable medium contains computer readable program code that, when executed, causes at least one processing device to obtain an obfuscation of a notification and initiate transmission of the obfuscation to an end-user device via an unsecure notification infrastructure. The medium also contains computer readable program code that, when executed, causes the at least one processing device, in response to a request from the end-user device, to initiate transmission of the notification to the end-user device via a secure connection.

In a fourth embodiment, a non-transitory computer readable medium contains computer readable program code that, when executed, causes at least one processing device of a mobile device to receive an obfuscation of a notification at the mobile device via an unsecure notification infrastructure and initiate transmission of a request for the notification via a secure connection. The medium also contains computer readable program code that, when executed, causes the at least one processing device to receive the notification at the mobile device via the secure connection and present the notification at the mobile device.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
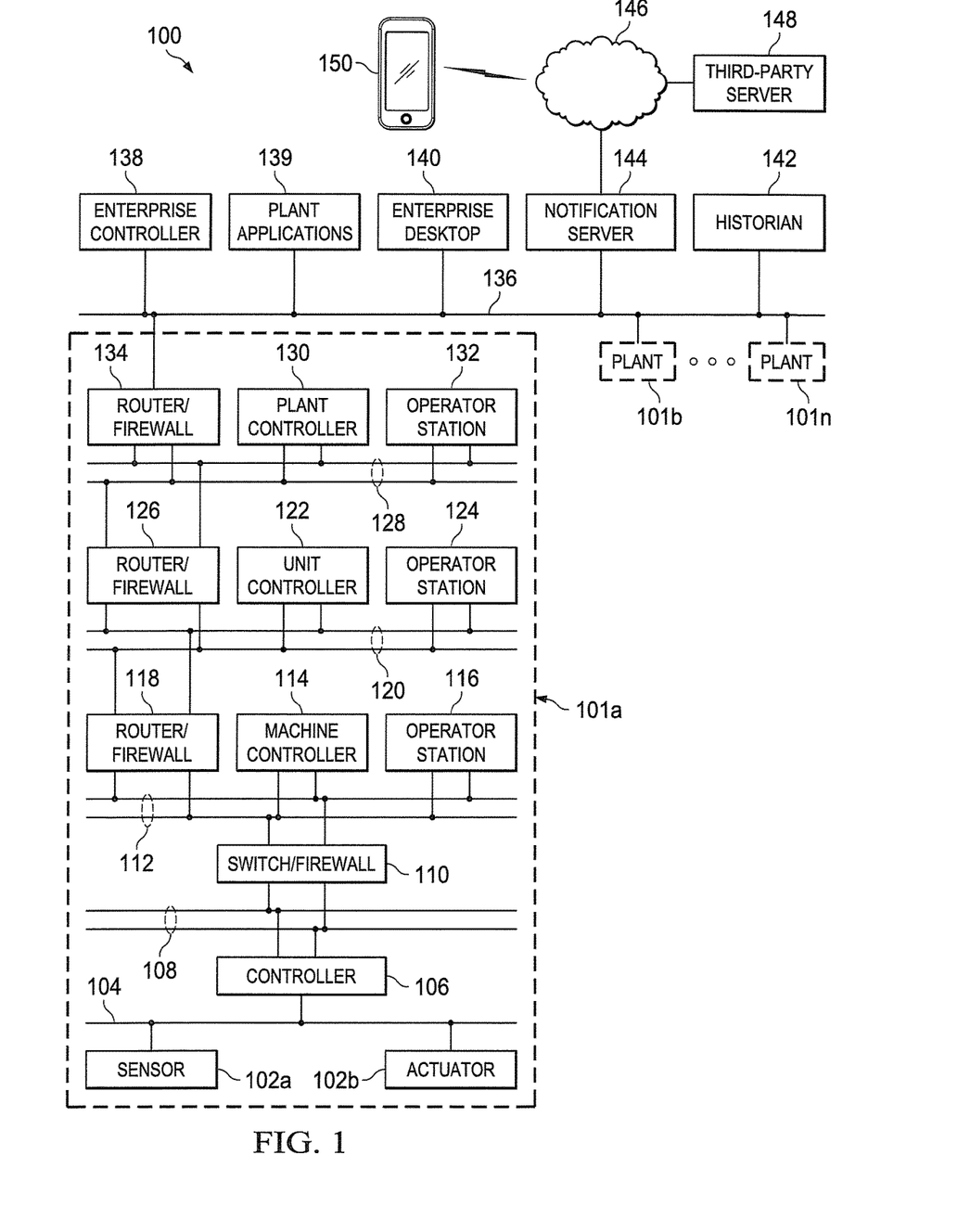
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102*a*, actuators 102*b*, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Various plant applications 139 could also be executed in the system 100. In this example, the plant applications 139 are shown as residing on Level 5 of the system 100, although plant applications 139 could reside on other or additional levels of the system 100. The plant applications 139 could represent any suitable applications that are executed by server computers or other computing devices.

Access to the enterprise-level controllers 138 and plant applications 139 may be provided by one or more enterprise desktops (also referred to as operator stations) 140. Each of the enterprise desktops 140 includes any suitable structure for supporting user access and control of one or more components in the system 100. Each of the enterprise desktops 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 142 can be coupled to the network 136. The historian 142 could represent a component that stores various information about the system 100. The historian 142 could, for instance, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 and each of the operator stations 116, 124, 132, 140 could include one or more processing devices and one or more memories for storing instructions and data used, generated, or collected by the processing device(s). Each of the controllers 106, 114, 122, 130, 138 and each of the operator stations 116, 124, 132, 140 could also include at least one network interface, such as one or more Ethernet interfaces or wireless transceivers, facilitating communication over one or more networks or communication paths.

The widespread use of mobile "smart" devices (such as APPLE IPHONEs and IPADs and ANDROID devices) allows users to remain connected and to interact with remote computing devices from virtually anywhere each user travels. Among other things, this could allow personnel associated with an industrial process control and automation system to receive warnings, alerts, or other notifications associated with events and other information and trigger actions associated with the control and automation system, regardless of whether the personnel are physically located at an industrial site. For example, events that are generated in a process control and automation system are often presented to operators currently on shift in one or more control rooms. There may also typically be a need or desire to inform users outside of control rooms, outside of an industrial plant, or while off network of events that are happening in the control and automation system. These events can come from a variety of applications, such as from a distributed control system (DCS) itself, advanced process control applications, operations applications, or business applications. Delivery of notifications describing these events to a user's handheld mobile device enables the user to receive notifications virtually anywhere and at any time.

To support this functionality, the system 100 includes a notification server 144, which receives data from other component(s) of the system 100 and generates notifications for users. For example, the notification server 144 could receive information identifying different events that occur with the system 100. The events could be associated with any suitable activities or conditions in the system 100, such as the generation of warnings or alerts by other components in the system 100. The notification server 144 could receive this information in any suitable manner and from any suitable source(s), such as from a historian, controller, or plant application. The notification server 144 uses this information to generate notifications (such as push notifications) and other messages to be sent to appropriate users. The notification server 144 could also provide additional information to appropriate users in response to user interactions with those notifications or other messages.

The notification server 144 communicates over a third-party network 146 with a third-party server 148. The third-party network 146 generally represents any suitable communication network(s) outside the system 100 (and therefore out of the control of the owners/operators of the system 100). The third-party network 146 could, for example, represent the Internet, a cellular communication network, or other network or combination of networks. The third-party server 148 represents a server used to provide notifications to end-user devices 150. For example, the third-party server 148 could push notifications to the end-user devices 150, allow retrieval of notifications by the end-user devices 150 at specified intervals or when requested, or provide notifications in any other suitable manner. The end-user devices 150 can then connect to the notification server 144 over the network 146 to receive details about notifications and events or to query for any notifications. As a particular example, the third-party server 148 could be used by companies like APPLE, SAMSUNG, or GOOGLE to provide push notifications or other notifications to mobile devices.

The end-user devices 150 denote any suitable user devices that can receive and present notifications to users. Examples of end-user devices 150 include smartphones, tablet computers, or other communication/computing devices. Specific examples could include APPLE IPHONEs, APPLE IPADs, and ANDROID devices.

Sending notifications of current events related to the control and automation system 100 to mobile users can provide various benefits. For example, it enables the users to know what is happening in the system 100 and provides them with an opportunity to respond. However, conventional consumer-grade mobile devices receive notifications over public notification networks (such as the network 146). For example, notifications are often pushed to mobile devices, and the notifications are often transmitted over public networks like the Internet. These notifications therefore potentially allow the exposure of proprietary information associated with an industrial facility.

This disclosure provides a technique in which an obfuscation of a notification is sent to one or more end-user devices in an unsecure manner over at least one public network. The obfuscation provides a receiving device with the ability to securely obtain an original notification while ensuring that the information transmitted over a public network leaks no proprietary data. This can be accomplished in the following manner.

When the notification server 144 identifies a need to notify at least one user of an event, the notification server 144 generates an original notification and an obfuscation associated with the original notification. The obfuscation ideally identifies the original notification without disclosing some or all proprietary information contained in the original notification. For example, the obfuscation could denote a unique identifier (such as an alphanumeric code) associated with the original notification or a brief summary of the original notification. The notification server 144 then sends the obfuscation as an obfuscated notification through a public notification service, such as one where the server 148 sends a push or other notification with the obfuscation to one or more end-user devices 150.

When the obfuscation is received by an end-user device 150, a user can open an installed application on the end-user device 150 (if the application is not already executing), and the application can cause the end-user device 150 to connect to the notification server 144 or other device using a secure protocol (such as by using Virtual Private Network). Using the obfuscation, the end-user device 150 requests the original notification, which is transmitted to the end-user device 150 by the notification server 144 using the secure protocol.

In this way, little or no proprietary information is transmitted in an unsecure manner over a public network to an end-user device. Rather, an obfuscation can be transmitted in an unsecure manner via a public notification network, where the obfuscation provides little or no proprietary information. Assuming an end-user device 150 is properly authenticated (such as via a user's username and password), the end-user device 150 can use the obfuscation and a secure protocol to obtain a notification that contains proprietary information, which can be displayed by the end-user device 150 or used in any other suitable manner. As a result, proprietary information can be securely transmitted to the end-user device 150, protecting the proprietary information.

Note that while the functionality for protecting information sent via a public notification infrastructure is described as being used with an industrial process control and automation system 100, this is for illustration only. The functionality for protecting information sent via a public notification network could be used in any suitable manner to protect any suitable information, whether or not that information relates to industrial process control and automation.

Although FIG. 1 illustrates one example of an industrial process control and automation system 100, various changes may be made to FIG. 1. For example, a control and automation system could include any number of sensors, actuators, controllers, operator stations, networks, servers, end-user devices, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which notification obfuscations can be sent over public (non-secure) networks. This functionality can be used in any other suitable system.

Figure 2:
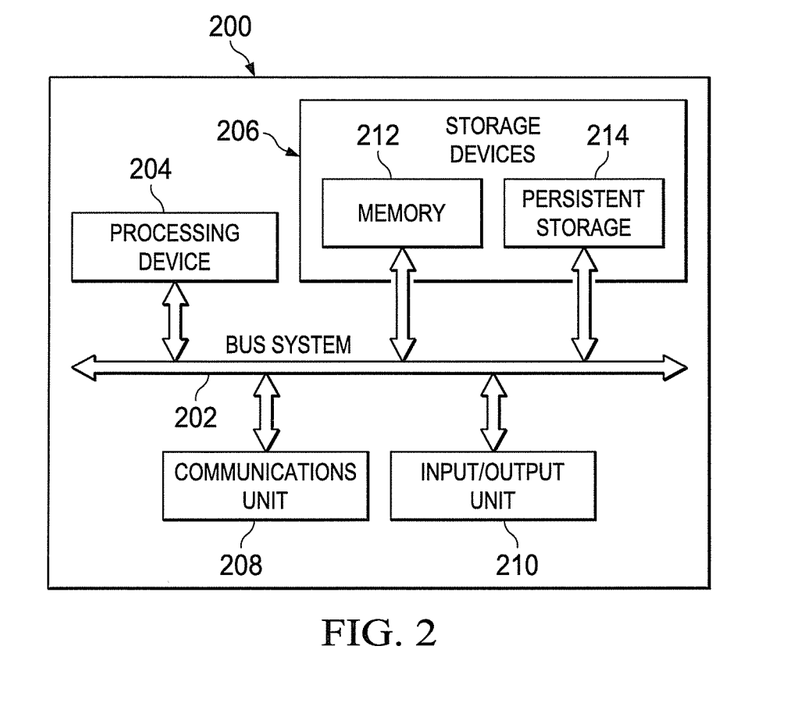
FIG. 2 illustrates an example device supporting protection of proprietary information over a public notification infrastructure according to this disclosure.

FIG. 2 illustrates an example device 200 supporting protection of proprietary information over a public notification infrastructure according to this disclosure. The device 200 could, for example, represent the notification server 144 or the end-user device 150 in the system 100 of FIG. 1. However, the notification server 144 or the end-user device 150 could be implemented using any other suitable device or system, and the device 200 could be used in any other suitable system (whether or not that system relates to process control and automation).

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 208 supports communications with other systems or devices. For example, the communications unit 208 could include a network interface that facilitates communications over at least one Ethernet, HART, FOUNDATION FIELDBUS, or other network. The communications unit 208 could also include a wireless transceiver facilitating communications over at least one wireless network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

When implementing the notification server 144, the device 200 could execute instructions used to perform any of the functions associated with the notification server 144. For example, the device 200 could execute instructions that detect the occurrence of various events, such as by detecting warnings or alarms generated in the system 100, and that generate original notifications associated with the events. The device 200 could also receive the original notifications from other components rather than generating the original notifications itself. The device 200 could also execute instructions that generate unique identifiers or other obfuscations and that associate the obfuscations with the events or the original notifications. Again, the device 200 could also receive the obfuscations from other components rather than generating the obfuscations itself. The device 200 could further execute instructions that send the obfuscations as obfuscated notifications to a third-party server 148 for delivery to end-user devices 150. In addition, the device 200 could execute instructions that detect applications at the end-user devices 150 securely requesting the original notifications and that securely transmit the original (non-obfuscated) notifications to the end-user devices 150.

When implementing the end-user device 150, the device 200 could execute instructions used to perform any of the functions associated with the end-user device 150. For example, the device 200 could execute instructions that receive obfuscated notifications, establish a secure connection with the notification server 144 or other component of the system 100, and request non-obfuscated notifications. The device 200 could also execute instructions that display the non-obfuscated notifications to a user and that facilitate interactions with the user.

Although FIG. 2 illustrates one example of a device 200 supporting protection of proprietary information over a public notification infrastructure, various changes may be made to FIG. 2. For example, components could be added, omitted, combined, further subdivided, or placed in any other suitable configuration according to particular needs. Also, computing and mobile communication devices can come in a wide variety of configurations, and FIG. 2 does not limit this disclosure to any particular configuration of computing or mobile communication device.

Figure 3:
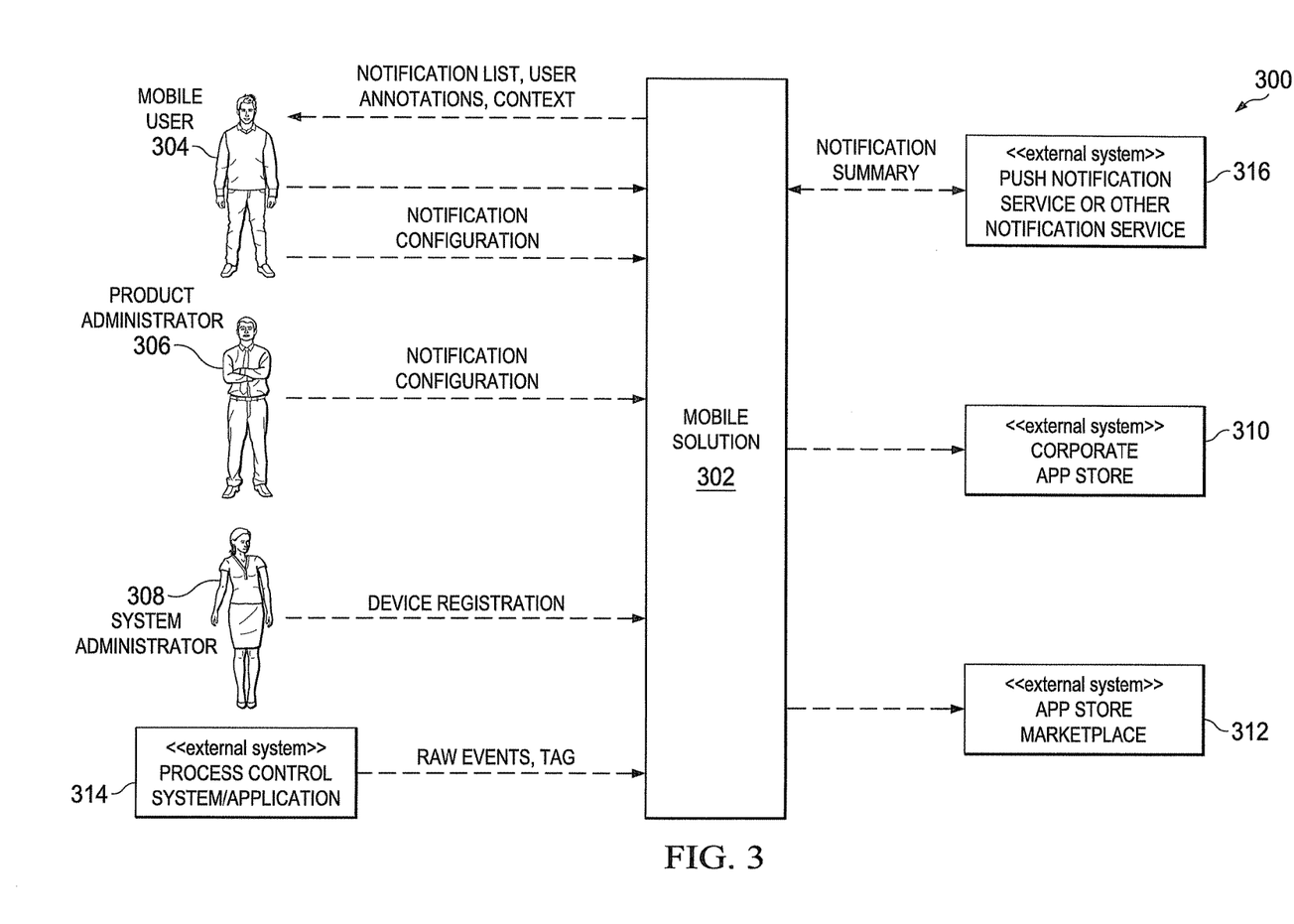
FIG. 3 illustrates an example context model supporting protection of proprietary information over a public notification infrastructure according to this disclosure.

FIG. 3 illustrates an example context model 300 supporting protection of proprietary information over a public notification infrastructure according to this disclosure. For ease of explanation, the context model 300 is described as being supported by the industrial process control and automation system 100 of FIG. 1. However, the context model 300 could be supported by any other suitable system.

As shown in FIG. 3, the context model 300 includes a mobile solution 302, which generally denotes at least part of the functionality of the notification server 144 and the application executed by the end-user devices 150. The mobile solution 302 interacts with three types of users 304-308 in this example, namely mobile users 304, product administrators 306, and system administrators 308. The mobile users 304 generally denote end users who use the end-user devices 150 to receive notifications and optionally act on those notifications. For example, the mobile users 304 could use the end-user devices 150 to review notifications regarding events in the industrial process control and automation system 100 and interact with other users to resolve undesirable or problematic situations in the system 100. Note, however, that the notifications could be used in any other suitable manner. The mobile users 304 could also have the ability to configure or control the notifications that are sent to those mobile users 304, such as by defining different rules used to generate the notifications.

The product administrators 306 represent users who configure the functionality of the mobile solution 302. For example, the product administrators 306 could define rules or other logic that control the generation of the notifications. As a particular example, the product administrators 306 could create rules that define the notifications sent in response to various events, the users who receive those notifications, and the contents of those notifications. In some embodiments, rules can be defined for different roles, and associations of users to those roles can be used to identify the mobile users 304 who receive notifications for those roles. As noted above, end users can also create their own rules for notifications, and the product administrators 306 could have the ability to review, modify, or delete the end user-created rules.

The system administrators 308 represent users who are responsible for allowing the mobile application executed by the end-user devices 150 to be authorized in their environment. For example, the system administrators 308 could grant permissions for end-user devices 150 to access the mobile solution 302 and register the end-user devices 150 with the mobile solution 302.

The application executed by the end-user devices 150 could be provided via an electronic store or marketplace, such as a corporate store 310 or a third-party store 312. Each electronic store 310-312 generally represents a computing system hosting one or more applications or "apps" that can be downloaded to the end-user devices 150. As the names imply, the corporate store 310 denotes a computing system operated by a corporation or other entity associated with the industrial process control and automation system 100 or other system. The third-party store 312 denotes a computing system operated by a third party unrelated to the industrial process control and automation system 100 or other system, such as APPLE or GOOGLE. End users can use their end-user devices 150 to access one or more of the electronic stores 310-312 and download an app that supports the use of obfuscated notifications.

Once configured and placed into operation, the mobile solution 302 receives information about events from various sources, such as one or more process control systems or applications 314. Each process control system or application 314 could represent any component within the industrial process control and automation system 100 that can generate events or data indicative of events. In some instances, a process control system or application 314 can be designed to specifically integrate with the mobile solution 302, and the process control system or application 314 can itself provide events with or without tags (event-related information) to the mobile solution 302. In other instances, a process control system or application 314 may be unable to provide this information to the mobile solution 302 itself, and a plug-in or other mechanism can be used with the process control system or application 314 to identify events and transmit information to the mobile solution 302.

However the events are detected, the mobile solution 302 receives information about the events and uses rules or other logic to generate notifications for mobile users 304. The mobile solution 302 also generates obfuscated messages (such as unique alphanumeric codes) for the generated notifications. The obfuscated messages are sent to a third-party notification service 316, which could denote a service provided by the third-party server 148. The third-party notification service 316 could include an APPLE or ANDROID push notification service, although other push or non-push notification services could be used. The third-party notification service 316 provides the obfuscated messages to the end-user devices 150 used by the mobile users 304 as obfuscated notifications, and the obfuscated notifications include the unique identifiers or other obfuscations (in human-readable and/or machine-readable form).

The obfuscations are used by the end-user devices 150 to securely interact with the mobile solution 302 in order to obtain and present non-obfuscated notifications to the mobile users 304. For example, one or more unique identifiers received by an end-user device 150 can be used to retrieve and present a listing of notifications for a particular mobile user 304, where the listing identifies the notification messages, their associated identifiers, and some (or possibly all) of the fields of the notification messages. Annotations or other text-based communications associated with those notifications can also be provided to or received from the end-user device 150. Annotations could include communications such as comments from users or read receipts, forwarding indicators, or other system-generated annotations. In addition, context (such as detailed historical data for one or more process variables) can be provided to the end-user device 150. Note, however, that notifications can be used in any other suitable manner and that any other suitable data associated with the notifications can be sent to or received from the end-user devices 150.

Although FIG. 3 illustrates one example of a context model 300 supporting protection of proprietary information over a public notification infrastructure, various changes may be made to FIG. 3. For example, additional types of users could be associated with the mobile solution 302, or functions of multiple user types could be combined. Also, while specific entities such as APPLE and ANDROID are described above, other stores or notification services could be used. In addition, various components could be added, omitted, combined, further subdivided, or placed in any other suitable configuration according to particular needs.

Figure 4:
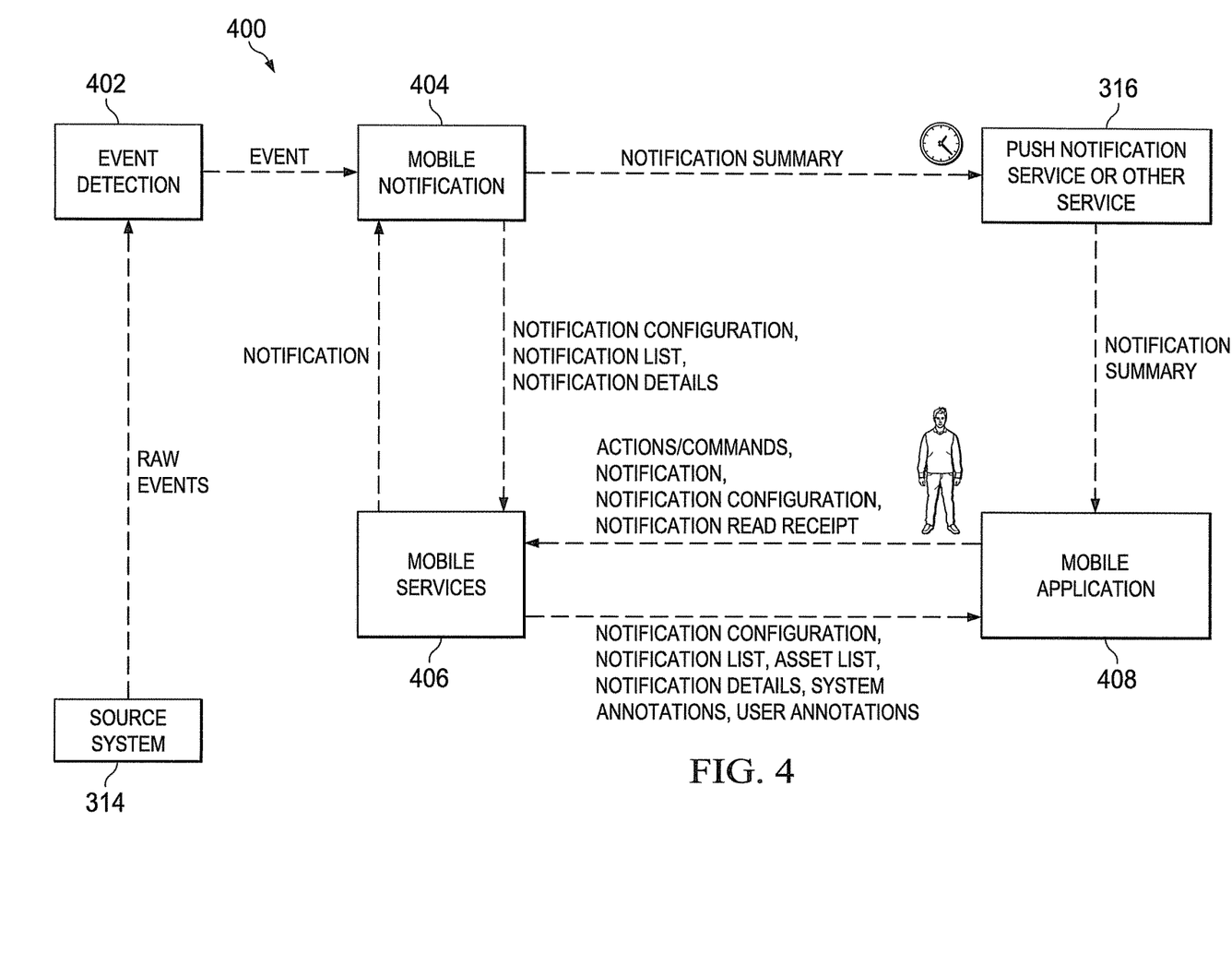
FIG. 4 illustrates an example system model supporting protection of proprietary information over a public notification infrastructure according to this disclosure.

FIG. 4 illustrates an example system model 400 supporting protection of proprietary information over a public notification infrastructure according to this disclosure. For ease of explanation, the system model 400 is described as being supported by the industrial process control and automation system 100 of FIG. 1. However, the system model 400 could be supported by any other suitable system.

As shown in FIG. 4, the system model 400 includes an event detection unit 402, a mobile notification unit 404, and a mobile services unit 406. These units 402-406 could, for example, denote different functional units of the mobile solution 302. Each of the units 402-406 could be implemented using any suitable hardware or a combination of hardware and software/firmware instructions. For instance, each of the units 402-406 could be implemented using one or more software routines executed by the processing device(s) 204 of the notification server 144.

The event detection unit 402 receives information associated with events, such as from one or more process control systems or applications 314. The information associated with the events could include information such as a time of an event, a source of the event, a condition associated with the event, a category (such as minor, major, or critical) of the event, and a description of the event. The event detection unit 402 can obtain the information about the events in any suitable manner. For example, the event detection unit 402 could poll the process control systems or applications 314 at specified intervals, in response to triggering events, or at other times. The event detection unit 402 could also receive the information from plug-ins or other data collection components in or associated with the process control systems or applications 314 at specified intervals, in response to triggering events, or at other times. The events here could represent all events generated by the process control systems or applications 314 or only a subset of events generated by the process control systems or applications 314 (such as only certain types of events). The event detection unit 402 processes the information and outputs information identifying the events, such as in a standard format, to the mobile notification unit 404.

The mobile notification unit 404 receives the information identifying the events from the event detection unit 402 and generates obfuscated notifications for end-user devices 150. For example, the mobile notification unit 404 can generate non-obfuscated notifications containing suitable information about the events, generate unique identifiers for the non-obfuscated notifications, and generate obfuscated notifications that include the unique identifiers. The obfuscated notifications (referred to in FIG. 4 as notification summaries) are sent to the third-party notification service 316 for delivery to mobile applications 408. The mobile applications 408 represent an application executed by one or more end-user devices 150. The mobile notification unit 404 also provides various information, such as lists of notifications and the notifications themselves, to the mobile services unit 406.

The mobile services unit 406 interacts with each mobile application 408 securely, such as by using VPN or other secure communication protocol. The mobile services unit 406 performs various functions related to non-obfuscated notifications. For example, the mobile services unit 406 could receive unique identifiers or other obfuscations from the mobile applications 408, retrieve the non-obfuscated notifications associated with those obfuscations, and provide the non-obfuscated notifications to the mobile applications 408. The mobile services unit 406 can also manage lists of notifications that particular users have received, manage read-receipts for notifications that are read or viewed on the users' end-user devices 150, and allow rules to be configured by the end-user devices 150. The mobile services unit 406 can further provide user-generated or system-generated annotations to the end-user devices 150 and receive user annotations from end-user devices 150 for delivery to other end-user devices 150. In addition, the mobile services unit 406 can receive invocations of various commands from the end-user devices 150, such as commands for obtaining historical data, user comments, or other information about a specific notification.

Although FIG. 4 illustrates one example of a system model 400 supporting protection of proprietary information over a public notification infrastructure, various changes may be made to FIG. 4. For example, various components could be added, omitted, combined, further subdivided, or placed in any other suitable configuration according to particular needs. Also, various components in FIG. 4 (such as components 402-406) could be implemented using a common device, or at least some of those components could be implemented using different devices.

Figure 5:
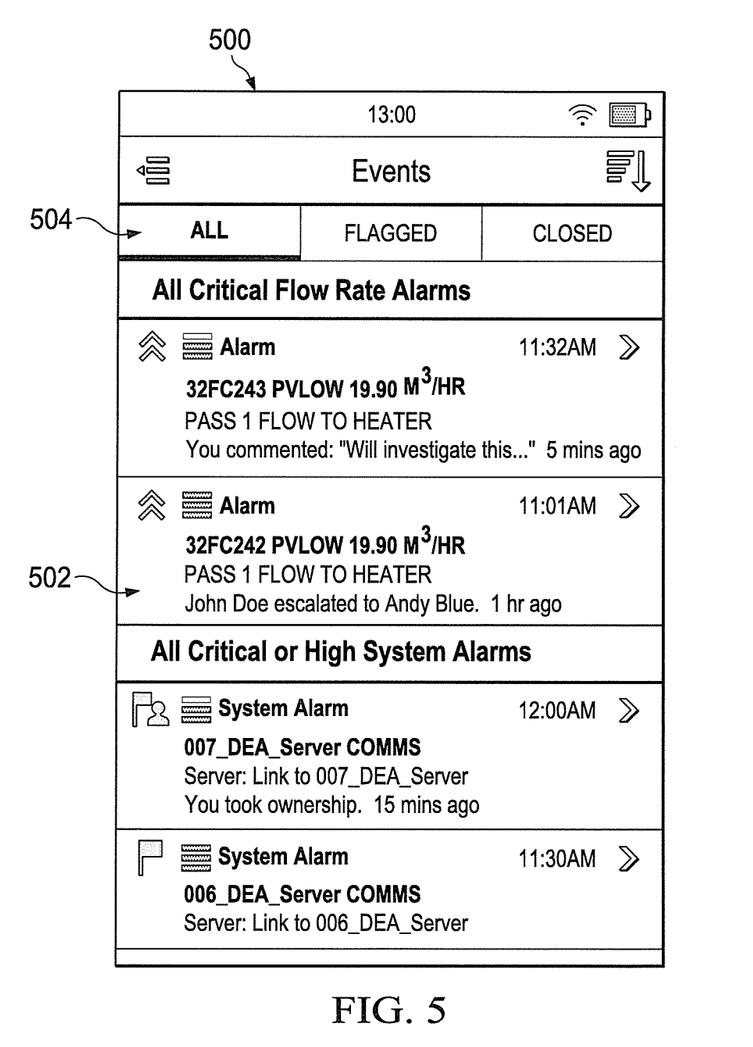
FIGS. 5 through 7 illustrate example notifications related to an industrial process control and automation system according to this disclosure.
Figure 6:
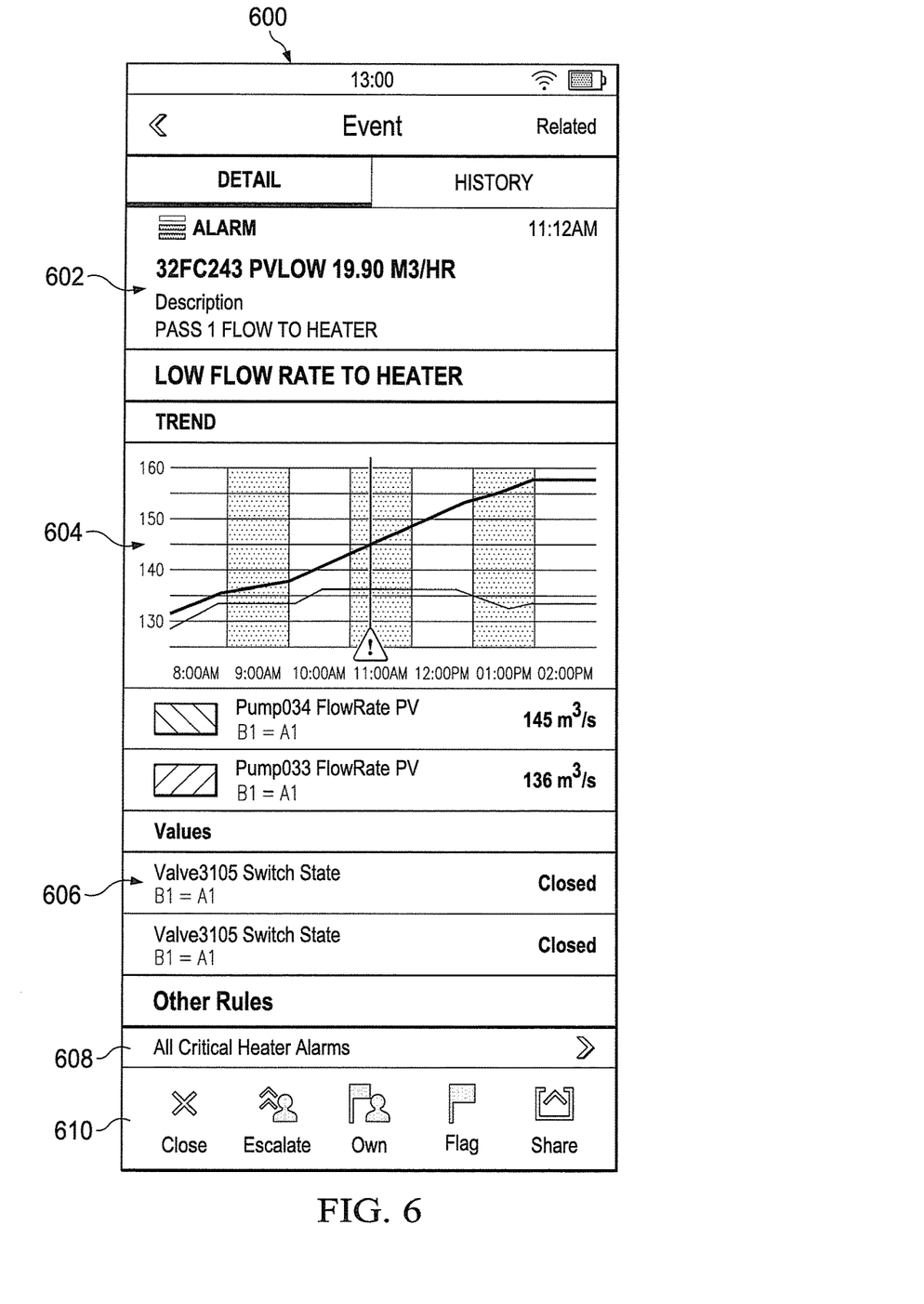
Figure 7:
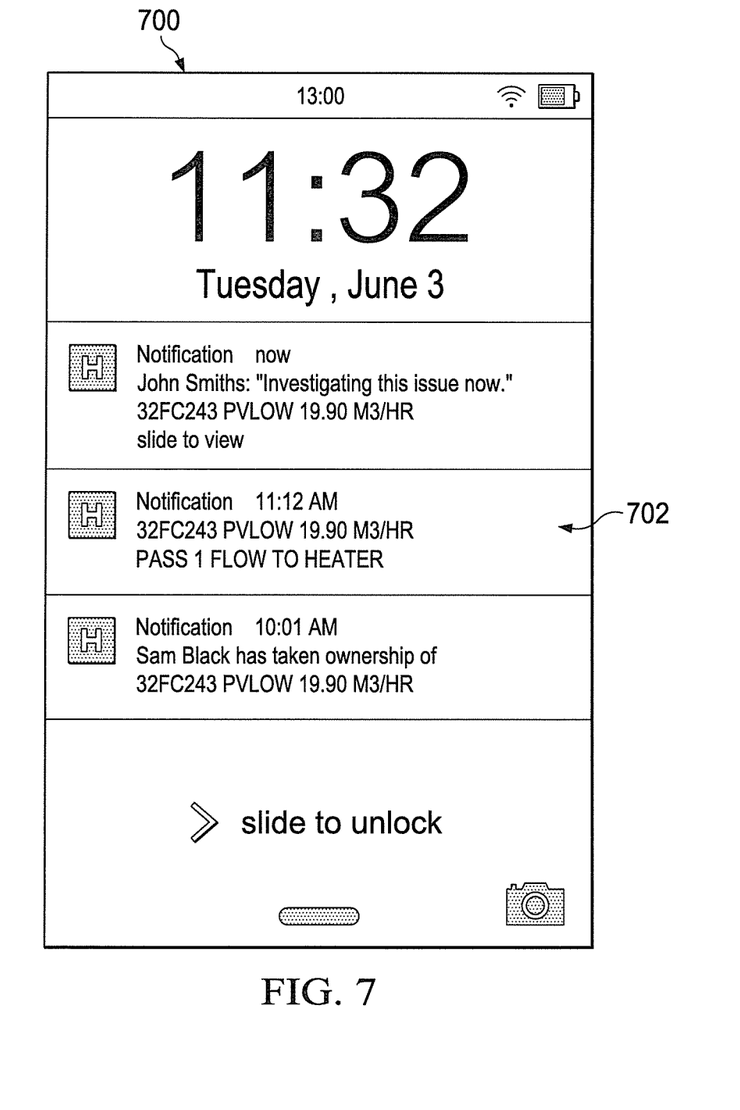

FIGS. 5 through 7 illustrate example notifications related to an industrial process control and automation system according to this disclosure. As shown in FIG. 5, a graphical user interface 500 can be presented by the mobile application 408 on the display screen of an end-user device 150. The graphical user interface 500 here includes a listing of notifications 502. Each notification 502 includes various details about an event, such as a name and severity of the event, a time of the notification, and comments about the event. As shown in this example, the notifications 502 are grouped into different categories, although other categories or arrangements could be used. The graphical user interface 500 also includes various controls 504, such as controls for viewing all notifications, flagged notifications, or closed notifications and controls for changing the viewing arrangement.

Selection of a specific notification 502 in the graphical user interface 500 could cause the mobile application 408 to present a graphical user interface 600 as shown in FIG. 6. The graphical user interface 600 includes information 602 identifying a particular event and a trend diagram 604 showing historical values of one or more process variables associated with the particular event. The graphical user interface 600 also includes specific process variable values 606 associated with the event and an identification of the rule(s) 608 that triggered the notification or that are related to the notification. In addition, the graphical user interface 600 includes controls 610 that allow a user to close a notification, escalate the notification to one or more specific users, own the notification (meaning the user will be responsible for resolving the event), flag the notification (so it appears as a flagged notification in FIG. 5), or share the notification with other users.

FIG. 7 illustrates an example lock screen 700 of the end-user device 150, where the lock screen 700 includes notifications 702 received while the end-user device 150 is locked or in a standby mode. Again, the notifications 702 include various information about events. Swiping on or otherwise selecting one of the notifications 702 in the lock screen 700 could cause the end-user device 150 (after user authentication if required) to display the graphical user interface 500 of FIG. 5 or the graphical user interface 600 of FIG. 6.

Note that in FIGS. 5 through 7, the notifications are shown with relevant details included. This indicates that the mobile application 408 has received unique identifiers or other obfuscations for those notifications and already retrieved non-obfuscated notifications from the notification server 144. This could occur manually after the end-user device 150 presents an indication that there are notifications and a user activates the mobile application 408 in order to retrieve the non-obfuscated notifications. This could also occur automatically, such as when the mobile application 408 is already running on the end-user device 150 (even as a background app) and can retrieve the non-obfuscated notifications without user interaction.

Although FIGS. 5 through 7 illustrate examples of notifications related to an industrial process control and automation system, various changes may be made to FIGS. 5 through 7. For example, the content and arrangement of each graphical interface or screen are for illustration only. Also, while shown as being used with an APPLE IPHONE, the notifications could be used with any other suitable devices.

Figure 8:
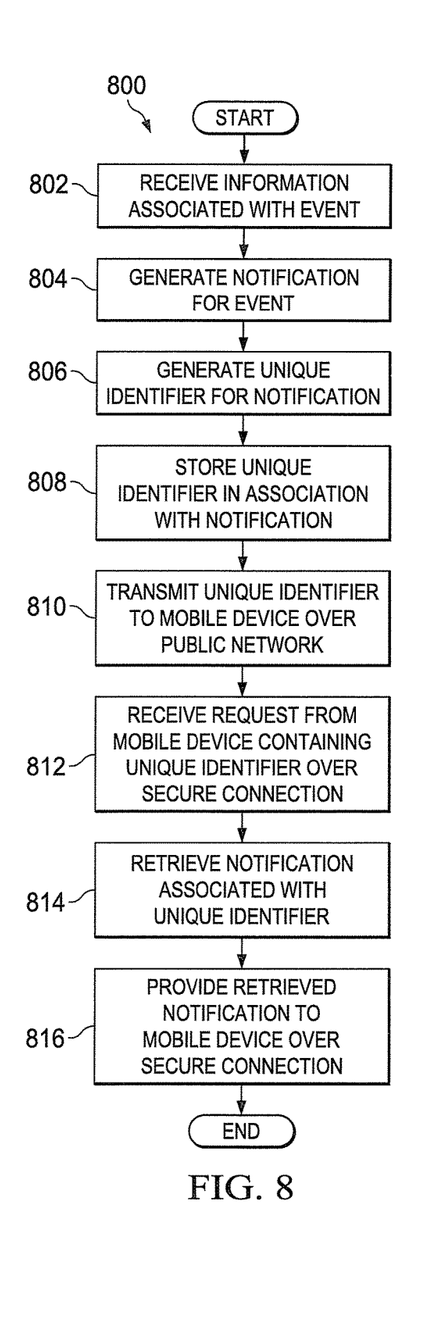
FIGS. 8 and 9 illustrate example methods supporting protection of proprietary information over a public notification infrastructure according to this disclosure.
Figure 9:
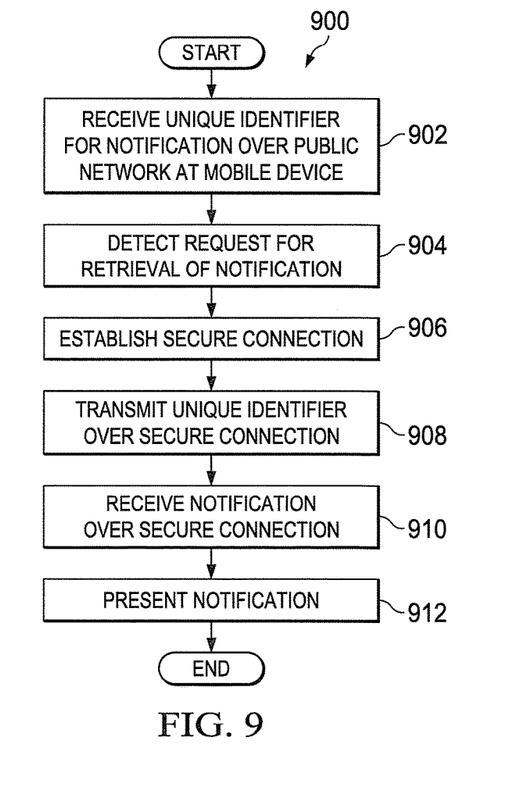

FIGS. 8 and 9 illustrate example methods 800 and 900 supporting protection of proprietary information over a public notification infrastructure according to this disclosure. In particular, the method 800 could be performed by the notification server 144 or other device(s) within an industrial control and automation system, and the method 900 could be performed by an end-user device 150. However, each method could be performed using any other suitable device or system (whether or not that device or system relates to process control and automation).

As shown in FIG. 8, information associated with an event is received at step 802. This could include, for example, the mobile notification unit 404 receiving data from the event detection unit 402, where the data identifies an event that has occurred. A notification associated with the event is generated at step 804. This could include, for example, the mobile notification unit 404 using one or more rules to identify one or more users to receive a notification associated with the event. Each rule could identify the condition(s) to be met in order to satisfy the rule and the contents of a notification to be generated if the condition(s) is/are satisfied.

A unique identifier associated with the notification is generated at step 806. This could include, for example, the mobile notification unit 404 identifying a unique alphanumeric or other identifier that is uniquely associated with the notification. Any suitable technique could be used to generate the unique identifier, such as a monotonically increasing number in combination with one or more letters. The unique identifier is stored in association with the notification at step 808. This could include, for example, the mobile notification unit 404 storing the unique identifier and the notification in a memory.

The unique identifier is transmitted to a mobile device over a public network at step 810. This could include, for example, the mobile notification unit 404 interacting with the third-party notification service 316 to transmit the unique identifier as part of an obfuscated notification to at least one end-user device 150. A request containing the unique identifier is received from the mobile device over a secure connection at step 812. This could include, for example, the mobile services unit 406 establishing a VPN or other secure connection with the end-user device 150. This could also include the mobile services unit 406 receiving the request from the end-user device 150 over the secure connection. The notification associated with the unique identifier is retrieved at step 814 and provided to the mobile device over the secure connection at step 816. This could include, for example, the mobile services unit 406 providing a non-obfuscated notification to the end-user device 150.

Note that in this process, the non-obfuscated notification is generated at step 804, stored at step 808, and retrieved at step 814. In other embodiments, the event information can be stored at step 808 and retrieved at step 814, and the non-obfuscated notification can then be generated using the retrieved event information. In general, this disclosure encompasses any technique for receiving event information, generating an event notification, and associating the event notification with a unique identifier.

As shown in FIG. 9, a unique identifier for a notification is received at a mobile device at step 902. This could include, for example, an end-user device 150 receiving an obfuscated notification containing the unique identifier from the third-party server 148 via the third-party notification service 316. The obfuscated notification could be displayed to a user of the end-user device 150, or an indicator than an obfuscated notification has been received could be displayed to a user of the end-user device 150.

A request for retrieval of a non-obfuscated notification is detected at step 904. This could include, for example, the user of the end-user device 150 opening the mobile application 408 or selecting an obfuscated notification. Note, however, that step 904 may be optional. In some embodiments, if the mobile application 408 is already running (even as a background application), no additional request may be required to initiate retrieval of a non-obfuscated notification.

A secure connection is established at step 906. This could include, for example, the mobile application 408 causing the end-user device 150 to establish a VPN connection or other secure connection with the notification server 144 or other device. The unique identifier is transmitted over the secure connection at step 908. This could include, for example, the mobile application 408 transmitting a request for a non-obfuscated message over the secure connection to the notification server 144, where the request includes the unique identifier. A non-obfuscated notification is received over the secure connection at step 910 and presented at step 912. This could include, for example, the mobile application 408 receiving the notification and presenting the notification in the graphical user interface 500, the lock screen 700, or some other graphical interface of the end-user device 150. At this point, the notification could be selected to view additional information about an event, or other actions could be initiated by the user related to the notification.

In this way, only the unique identifier may be provided over a public network as part of an obfuscated message. Ideally, even if someone intercepts the obfuscated message, that person could not authenticate with the notification server 144 and obtain a non-obfuscated notification associated with the unique identifier.

Although FIGS. 8 and 9 illustrate examples of methods supporting protection of proprietary information over a public notification infrastructure according, various changes may be made to FIGS. 8 and 9. For example, while each figure shows a series of steps, various steps in each figure could overlap, occur in parallel, occur in a different order, or occur any number of times. Also, while unique identifiers are shown here as forming the obfuscations sent over the public network, other types of obfuscations (such as summaries) could be sent over the public network. In addition, each method could include any number of events, notifications, and obfuscations.

Note that in the above description, the formatting and protocol used for the "notification" sent via a secure channel could be different from the formatting and protocol used for the "obfuscated notification" sent via a public network. The obfuscated notification would use a formatting and protocol supported by the third-party server 148. The notification sent via a secure channel would use a formatting and protocol supported by the mobile application 408.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   generating an obfuscation of a notification, the obfuscation identifying the notification using a unique identifier without disclosing proprietary information contained in the notification;
   transmitting the obfuscation to an end-user device via an unsecure notification infrastructure;
   in response to a request from the end-user device, transmitting the notification to the end-user device via a secure connection; and
   receiving information associated with an event in an industrial process control and automation system, wherein the received information includes information of at least a time of the event, a source of the event, a condition associated with the event or a category of the event.

2. The method of claim 1, wherein transmitting the obfuscation to the end-user device comprises transmitting the obfuscation to a push notification service.

3. The method of claim 1, further comprising:
   establishing the secure connection to the end-user device; and
   receiving the request from the end-user device via the secure connection.

4. The method of claim 1, further comprising:
   storing at least one of the notification and the information in association with the obfuscation;
   wherein the notification contains the information.

5. The method of claim 1, further comprising:
   transmitting a list identifying multiple notifications to the end-user device; and
   transmitting details of at least one selected notification to the end-user device.

6. The method of claim 1, further comprising:
   receiving a rule defining one or more conditions and one or more contents; and
   generating the notification in response to the one or more conditions being satisfied, the notification containing the one or more contents.

7. The method of claim 1, wherein the obfuscation further comprises a summary of the notification.

8. An apparatus comprising:
   at least one memory configured to store a notification and an obfuscation of the notification, the obfuscation identifying the notification using a unique identifier without disclosing proprietary information contained in the notification;
   at least one interface configured to transmit the obfuscation to an end-user device via an unsecure notification infrastructure; and
   at least one processing device configured to;
      initiate transmission of the notification to the end-user device via a secure connection in response to a request from the end-user device, and
      receive information associated with an event in an industrial process control and automation system, wherein the received information includes information of at least a time of the event, a source of the event, a condition associated with the event or a category of the event.

9. The apparatus of claim 8, wherein the at least one processing device is further configured to:
   establish the secure connection to the end-user device; and
   receive the request from the end-user device via the secure connection.

10. The apparatus of claim 8, wherein:
    the at least one processing device is further configured to:
       store at least one of the notification and the information in association with the obfuscation; and
       the notification contains the information.

11. The apparatus of claim 8, wherein the at least one processing device is further configured to:
    initiate transmission of a list identifying multiple notifications to the end-user device; and
    initiate transmission of details of at least one selected notification to the end-user device.

12. The apparatus of claim 8, wherein the at least one processing device is further configured to:

receive a rule defining one or more conditions and one or more contents; and generate the notification in response to the one or more conditions being satisfied, the notification containing the one or more contents.

13. The apparatus of claim 8, wherein the obfuscation further comprises a summary of the notification.

14. A non-transitory computer readable medium containing computer readable program code that, when executed, causes at least one processing device to:

obtain an obfuscation of a notification, the obfuscation identifying the notification using a unique identifier without disclosing proprietary information contained in the notification;

initiate transmission of the obfuscation to an end-user device via an unsecure notification infrastructure; and in response to a request from the end-user device, to initiate transmission of the notification to the end-user device via a secure connection; and receive information associated with an event in an industrial process control and automation system, wherein the received information includes information of at least a time of the event, a source of the event, a condition associated with the event or a category of the event.

15. The non-transitory computer readable medium of claim 14, wherein the computer readable program code that when executed causes the at least one processing device to initiate transmission of the obfuscation to the end-user device comprises:

computer readable program code that when executed causes the at least one processing device to initiate transmission of the obfuscation to a push notification service.

16. The non-transitory computer readable medium of claim 14, further containing computer readable program code that when executed causes the at least one processing device to:

establish the secure connection to the end-user device; and receive the request from the end-user device via the secure connection.

17. The non-transitory computer readable medium of claim 14, further containing computer readable program code that when executed causes the at least one processing device to:

store at least one of the notification and the information in association with the obfuscation;

wherein the notification contains the information.

18. The non-transitory computer readable medium of claim 14, further containing computer readable program code that when executed causes the at least one processing device to:

initiate transmission of a list identifying multiple notifications to the end-user device; and initiate transmission of details of at least one selected notification to the end-user device.

19. A non-transitory computer readable medium containing computer readable program code that, when executed, causes at least one processing device of a mobile device to:

receive an obfuscation of a notification at the mobile device via an unsecure notification infrastructure, the obfuscation identifying the notification using a unique identifier without disclosing proprietary information contained in the notification;

initiate transmission of a request for the notification via a secure connection;

receive the notification at the mobile device via the secure connection;

present the notification at the mobile device; and receive information associated with an event in an industrial process control and automation system, wherein the received information includes information of at least a time of the event, a source of the event, a condition associated with the event or a category of the event.

* * * * *